United States Patent [19]

Kotani et al.

[11] 4,386,181
[45] May 31, 1983

[54] HEAT-AGING-RESISTANT RUBBER COMPOSITION

[75] Inventors: Teizo Kotani, Yokohama; Hiroji Enyo, Suzuka; Minoru Tanaka, Yokkaichi; Yasuhiko Takemura, Yokkaichi; Toshio Miyabayashi, Yokkaichi, all of Japan

[73] Assignee: Japan Synthetic Rubber Co., Ltd., Tokyo, Japan

[21] Appl. No.: 320,073

[22] Filed: Nov. 10, 1981

[51] Int. Cl.³ .......................... C08K 5/06; C08K 5/36
[52] U.S. Cl. .................................. 524/304; 524/303; 524/366; 524/377
[58] Field of Search ............... 252/404, 401; 260/809; 524/255, 349, 350, 377, 226, 366, 303, 304; 568/702, 703; 564/429, 433

[56] References Cited

U.S. PATENT DOCUMENTS

| | | | |
|---|---|---|---|
| 2,912,388 | 10/1959 | Leahy et al. | 524/311 |
| 3,012,269 | 1/1962 | Clough | 252/401 |
| 3,646,006 | 2/1972 | Lord | 564/429 |
| 3,658,769 | 4/1972 | Kline | 260/78 UA |
| 4,125,515 | 11/1978 | Kuczkowski | 260/45.8 NW |

FOREIGN PATENT DOCUMENTS 620180 1/1963 Belgium .
1403231 8/1975 United Kingdom .

OTHER PUBLICATIONS

Horvath, "Bound Antioxidant Stabilized NBR in Automotive Applications", Elastomerics, Aug. 1979, pp. 19 to 26 and 62.

*Primary Examiner*—V. P. Hoke
*Attorney, Agent, or Firm*—Oblon, Fisher, Spivak, McClelland & Maier

[57] ABSTRACT

A heat-aging-resistant rubbery polymer composition comprising a rubbery polymer, at least one compound selected from the group consisting of diphenylamine derivatives and phenol derivatives as an age resister for said rubbery polymer, and polyalkylene ether glycol having an average molecular weight of 100–5,000, and optionally a compound represented by the formula,

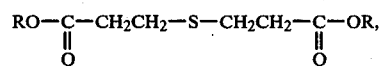

in which R is alkyl having 10 to 20 carbon atoms. Preferably, said at least one compound selected from the group consisting of diphenylamine derivatives and phenol derivatives is chemically linked to said rubbery polymer as a part of the molecular chain. Said rubbery polymer composition is unexpectedly superior in heat-aging-resistance to a composition consisting only of said rubbery polymer and said age resister or a composition consisting only of said rubbery polymer and said polyalkylene ether glycol.

11 Claims, No Drawings

HEAT-AGING-RESISTANT RUBBER COMPOSITION

This invention relates to a rubber composition containing an age resister. More particularly, this invention relates to a rubbery polymer composition containing an age resister and an age resister co-agent and exhibiting an excellent heat aging resistance when used in air at high temperatures.

In general, rubbery polymers, particularly polymers having unsaturated bonds in the molecular chain causes the deterioration phenomenon that they undergo the action of ozone, oxygen, heat or light to become soft or hard, whereby various characteristics of the rubber are reduced remarkably, and in many cases, this becomes a problem in practice. For the purpose of preventing such deteriorations, various age resisters such as of the phenol type, of the amine type and the like have hitherto been blended with the rubber, and a considerable effect has been obtained in an environment having a relatively mild temperature condition. Recently, however, the environment for the use of rubber products is becoming more and more severe and, as seen in the countermeasure for automobile waste gas, the temperature around engine has become higher than before owing to the improvement of engine. Under such severe use conditions, the hitherto known age resisters blended with rubber can no longer prevent the rubber from being deteriorated.

Accordingly, there has become required a rubbery polymer having an excellent heat-aging-resistance, the various properties of which can be maintained on a high level when the rubbery polymer is used in air at a high temperature.

The object of this invention is to provide a heat-aging-resistant rubbery polymer composition which enables the production of rubber products exhibiting an excellent heat-aging-resistance when used at high temperatures.

According to this invention, there is provided a heat-aging-resistant rubbery polymer composition comprising a rubbery polymer, at least one compound selected from the group consisting of diphenylamine derivatives and phenol derivatives as an age resister for said rubbery polymer, and a polyalkylene ether glycol having an average molecular weight of 100-5,000, (hereinafter referred to as age resister co-agent (I)), and optionally a compound represented by the formula,

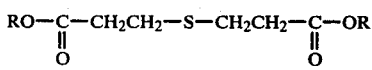

wherein R is alkyl having 10 to 20 carbon atoms (hereinafter referred to as age resister co-agent (II)).

In this invention, an amine type or phenol type age resister and a polyalkylene ether glycol are used in combination, owing to which the heat-aging-resistance of the rubbery polymer can be greatly improved as compared with the case of using an amine type or phenol type of age resister alone or a polyalkylene ether glycol alone.

As the diphenylamine derivatives usable in this invention, there may be mentioned diphenylamine, p-aminodiphenylamine, N-isopropylaminodiphenylamine, N-(4-anilinophenyl)acrylamide, N-(4-anilinophenyl)-methacrylamide, N-(4-anilinophenyl)benzoylamide and the like.

As the phenol derivatives, there may be used phenol, 2,6-di-t-butylphenol, 2,6-di-t-butylcresol and the like.

As said polyalkylene ether glycol (age resister co-agent (I)), there may be used polyethylene glycol, polypropylene glycol, polytetramethylene ether glycol, polyepichlorohydrin glycol and the like. The molecular weight of said polyalkylene ether glycol is 100–5,000, preferably 100–2,000. When the molecular weight is out of the range of 100–5,000, the addition of polyalkylene ether glycol cannot improve the heat-aging-resistance.

In this invention, the amounts of age resister and polyalkylene ether glycol are not critical, though they are usually used both in an amount of 0.01–10 parts by weight, preferably 0.1–5 parts by weight, per 100 parts by weight of the rubbery polymer. If their amounts are less than 0.01 part by weight, the aging resistant effect is too small. On the other hand, it cannot be said that the larger the amount, the better the result becomes, and the effect rather decreases if their amounts exceed 10 parts by weight.

The use of the age resister co-agent (II) can further improve the heat-aging-resistance of the rubbery polymer, and it may preferably be used in an amount of 0.1 to 10 parts by weight, more preferably 0.1 to 5 parts by weight, per 100 parts by weight of the rubbery polymer. As the age resistor co-agent (II),

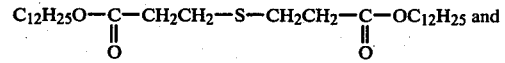

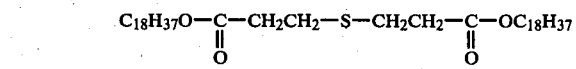

are more easily available and preferably used.

Though the kind of the rubbery polymer usable in this invention is not critical, polymers of diene type monomers which are susceptible to thermal deterioration, such as isoprene, butadiene, chloroprene and the like, are preferable in view of the effect of this invention. For example, butadiene-acrylonitrile copolymer (NBR), butadiene-styrene copolymer (SBR), isoprene-acrylonitrile copolymer (NIR), isoprene-butadiene-acrylonitrile copolymer (NBIR), polybutadiene (BR), polychloroprene (CR), polyisoprene (IR) and their mixtures are used.

In this invention, the age resister may be compounded with the rubbery polymer in the usual manner, or it may also be used as one of the monomer components in the production of the rubbery polymer so that it is copolymerized and chemically linked as a part of the rubbery polymer.

Though the method for blending the age resister is not critical, the age resister may be added to, for example, the latex or solution of the rubbery polymer, or, in the case of a solid rubber, the rubbery polymer and the age resister may be mixed together by means of a conventionally employed mixer such as a mixing roll or by means of a Banbury mixer.

The age resister chemically linked as a part of the rubbery polymer is represented by, for example, the following structural formulas of polymer unit:

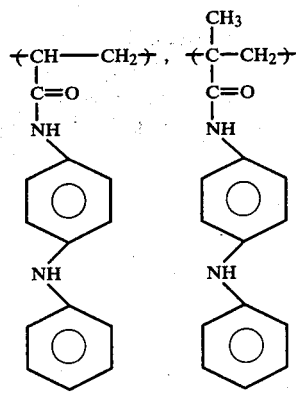

They can be obtained by copolymerizing the corresponding monomer, for example, N-(4-anilinophenyl)-acrylamide or N-(4-anilinophenyl)methacrylamide.

The process of the copolymerization may be any of emulsion polymerization, solution polymerization, suspension polymerization and the like, and usually, emulsion polymerization is employed. Though the temperature of the polymerization is not critical, it is preferably 0°–50° C.

Optionally, conventional compounding ingredients such as reinforcing material, filler, plasticizer, softening agent and vulcanizing agent may be compounded with the rubbery polymer composition of this invention. After vulcanization or without vulcanization, the resulting compound may not only be put to the general uses, but may also be used extensively in the fields requiring heat resistance, weather resistance, ozone resistance, oil resistance or the like, making the best use of the characteristic features of this invention. For example, the above-mentioned compound can be used satisfactorily as fuel house, printing roll, packing, sealant, diaphragm, coating material, adhesive and the like.

This invention will be explained concretely below referring to Examples which are not by way of limitation but by way of illustration. In the Examples, the compounding was carried out according to the recipe shown in Table 1.

TABLE 1

| | Amount |
|---|---|
| Rubbery polymer | 100 parts by weight |
| Age resister | (see Table 2) |
| Age resister co-agent | (see Table 2) |
| Carbon black (MAF) | 20 parts by weight |
| Silica (silicon dioxide) | 20 parts by weight |
| Silane coupling agent (A-189) | 0.2 part by weight |
| Plasticizer (DOP) | 10 parts by weight |
| Magnesium oxide | 5 parts by weight |
| Zinc oxide | 5 parts by weight |
| Stearic acid | 1 part by weight |
| Vulcanization accelerator TT* | 2 parts by weight |
| Vulcanization accelerator CZ** | 2 parts by weight |
| Sulfur | 0.5 part by weight |

Note:
*TT: tetramethylthiuram disulfide
**CZ: N—cylohexyl-2-benzothiazylsulfenamide
Conditions for vulcanization: Press-vulcanized at 160° C. for 30 minutes The properties were measured according to the following methods:

| (1) Tensile test | JIS K 6301-3 |
|---|---|
| (2) Hardness test | JIS K 6301-5 |
| (3) Aging test | JIS K 6301-6 |
| | (Geer oven aging test) |

EXAMPLES 1–17 AND COMPARATIVE EXAMPLES 1–4

Polyethylene glycol or polypropylene glycol was used as the polyalkylene ether glycol, and N-(4-anilinophenyl)methacrylamide, 2,6-di-t-butylcresol, 2,6-di-t-butylphenol or N-isopropylaminodiphenylamine was used as the age resister. Example 13 is a case where a combination of age resister co-agent (I) and age resister co-agent (II) was used. Examples 14–17 are cases in which the age resister was chemically linked to the polymer by copolymerization.

TABLE 2

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Rubbery polymer | NBR*1 | NBR*1 | NBR*1 | NBR*1 | NBR*1 | NBR*1 | NBR*1 | NBR*1 |
| Age resister Kind | APMA*7 | APMA*7 | APMA*7 | APMA*7 | APMA*7 | APMA*7 | APMA*7 | None |
| Amounts (parts by weight) | 2.0 | 2.0 | 2.0 | 2.0 | 2.0 | 2.0 | 2.0 | — |
| Age resister co-agent (I) Kind | PEG*5 | PPG*6 | PEG*5 | PEG*5 | None | PEG*5 | PEG*5 | PEG*5 |
| Molecular weight | 400 | 1,000 | 300 | 4,000 | — | 62 | 6,000 | 400 |
| Amount (parts by weight) | 2.5 | 2.5 | 2.5 | 2.5 | — | 2.5 | 2.5 | 2.5 |
| Age resister co-agent (II) Kind | — | — | — | — | — | — | — | — |
| Amount (Parts by weight) | — | — | — | — | — | — | — | — |
| Physical properties in normal state | | | | | | | | |
| $M_{100}$ *4 (kgf/cm²) | 19 | 20 | 18 | 20 | 28 | 17 | 21 | 20 |
| $T_B$ *4 (kgf/cm²) | 220 | 210 | 210 | 230 | 230 | 210 | 200 | 230 |
| $E_B$ *4 (%) | 550 | 540 | 580 | 520 | 500 | 560 | 530 | 570 |
| $H_S$ *4 (JIS-A) | 64 | 64 | 64 | 65 | 70 | 64 | 66 | 65 |
| Heat resistance (150° C. × 70 hrs) (percentage of change) | | | | | | | | |
| $\Delta T_B$ (%) | −41(−85)*12 | −42 | −40 | −49 | −54 | −51 | −55 | −60 |
| $\Delta E_B$ (%) | −59(−93)*12 | −61 | −58 | −68 | −82 | −79 | −81 | −89 |

TABLE 2-continued

| | | Example 5 | Example 6 | Example 7 | Example 8 | Example 9 | Example 10 | Example 11 | Example 12 |
|---|---|---|---|---|---|---|---|---|---|
| $\Delta H_S$*[11] | | +14(+19)*[12] | +13 | +13 | +15 | +17 | +18 | +16 | +20 |
| Rubbery polymer | | NBR*[1] | NBR*[1] | NBR*[1] | SBR*[2] | NBR*[1] | NBR*[1] | NBR*[1] | NBR*[1] |
| Age resister Kind | | DTBC*[8] | DTBP*[9] | IPDA*[10] | APMA*[7] | APMA*[7] | APMA*[7] | APMA*[7] | APMA*[7] |
| Amounts (parts by weight) | | 2.0 | 2.0 | 2.0 | 2.0 | 0.01 | 0.1 | 5.0 | 10.0 |
| Age resister co-agent (I) Kind | | PEG*[5] | PEG*[5] | PEG*[5] | PEG*[5] | PEG*[5] | PEG*[5] | PEG*[5] | PEG*[5] |
| Molecular weight | | 400 | 400 | 400 | 400 | 400 | 400 | 400 | 400 |
| Amount (parts by weight) | | 2.5 | 2.5 | 2.5 | 2.5 | 0.01 | 0.1 | 5.0 | 10.0 |
| Age resister co-agent (II) Kind | | — | — | — | — | — | — | — | — |
| Amount (Parts by weight) | | — | — | — | — | — | — | — | — |
| Physical properties in normal state | | | | | | | | | |
| $M_{100}$ *[4] (kgf/cm$^2$) | | 20 | 19 | 19 | 18 | 21 | 20 | 18 | 15 |
| $T_B$ *[4] (kgf/cm$^2$) | | 230 | 220 | 200 | 210 | 225 | 220 | 219 | 205 |
| $E_B$ *[4] (%) | | 560 | 550 | 530 | 540 | 510 | 520 | 560 | 580 |
| $H_S$ *[4] (JIS-A) | | 64 | 64 | 64 | 64 | 65 | 65 | 64 | 63 |
| Heat resistance (150° C. × 70 hrs) (percentage of change) | | | | | | | | | |
| $\Delta T_B$ (%) | | −45 | −48 | −46 | −45 | −52 | −46 | −42 | −51 |
| $\Delta E_B$ (%) | | −63 | −67 | −65 | −63 | −69 | −62 | −58 | −70 |
| $\Delta H_S$*[11] | | +15 | +16 | +14 | +15 | +15 | +14 | +13 | +16 |

| | | Example 13 | Example 14 | Example 15 | Example 16 | Example 17 |
|---|---|---|---|---|---|---|
| Rubbery polymer | | NBR*[1] | Age resister copolymer*[3] | Age resister copolymer*[3] | Age resister copolymer*[3] | Age resister copolymer*[3] |
| Age resister Kind | | APMA*[7] | None | None | None | None |
| Amounts (parts by weight) | | 2.0 | — | — | — | — |
| Age resister co-agent (I) Kind | | PEG*[5] | PEG*[5] | PEG*[5] | PEG*[5] | PEG*[5] |
| Molecular weight | | 400 | 400 | 400 | 400 | 400 |
| Amount (parts by weight) | | 2.5 | 2.5 | 0.1 | 5.0 | 2.5 |
| Age resister co-agent (II) Kind | | (C$_{12}$H$_{25}$O—C(=O)—CH$_2$CH$_2$—)$_2$S | — | — | — | — |
| Amount (Parts by weight) | | 1.0 | — | — | — | — |
| Physical properties in normal state | | | | | | |
| $M_{100}$ *[4] (kgf/cm$^2$) | | 18 | 19 | 20 | 19 | 19 |
| $T_B$ *[4] (kgf/cm$^2$) | | 215 | 225 | 230 | 215 | 235 |
| $E_B$ *[4] (%) | | 590 | 580 | 530 | 560 | 570 |
| $H_S$ *[4] (JIS-A) | | 62 | 65 | 65 | 64 | 65 |
| Heat resistance (150° C. × 70 hrs) (percentage of change) | | | | | | |
| $\Delta T_B$ (%) | | −28 | −40(−45)*[12] | −45(−49)*[12] | −44(−45)*[12] | −41(−46)*[12] |
| $\Delta E_B$ (%) | | −54 | −57(−60)*[12] | −61(−63)*[12] | −60(−60)*[12] | −56(−61)*[12] |

TABLE 2-continued

| | | | | | |
|---|---|---|---|---|---|
| $\Delta H_S$*[11] | +14 | +12(+14)*[12] | +14(+15)*[12] | +14(+14)*[12] | +12(+14)*[12] |

Note:
*[1]Acrylonitrile-butadiene rubber (JSR N220S, a trade name of Japan Synthetic Rubber Co., Ltd., bound acrylonitrile 40%, Mooney viscosity $ML_{1+4}$ (100° C.) 56).
*[2]Styrene-butadiene rubber (bound styrene 23.5%, grade 1500)
*[3]Acrylonitrile-butadiene-N—(4-anilinophenyl)-methacrylamide (Examples 14-16) or -acrylamide (Example 17) copolymer [bound acrylonitrile 40%, bound N—(4-anilinophenyl)methacrylamide 2% (Example 14), 0.1% (Example 15), 5.0% (Example 16), bound N—(4-anilinophenyl)acrylamide 2.0% (Example 17)]
*[4] $M_{100}$: 100% Tensile modulus;
$T_B$: Tensile strength;
$E_B$: Elongation;
$H_S$: Hardness.
*[5]Polyethylene glycol
*[6]Polypropylene glycol
*[7]N—(4-anilinophenyl)methacrylamide
*[8]2,6-Di-t-butylcresol
*[9]2,6-Di-t-butylphenol
*[10]N—isopropylaminodiphenylamine
*[11]The difference of the $H_S$ value before the heat treatment from the $H_S$ value after the heat treatment.
*[12]The values in the parentheses were obtained by immersing the vulcanizate in acetone at 40° C. for 96 hrs, provided that the acetone was replaced by fresh acetone every 24 hrs, and then subjecting the vulcanizate to the same heat-resistance test.

From the samples in which NBR or SBR was used as the rubbery polymer, rubber compounds were obtained according to the recipe shown in Table 1. The kneading was carried out by means of a Banbury mixer, and the resulting rubber compounds were press-vulcanized at 160° C. for 30 minutes to prepare test sheets. Physical properties were tested according to JIS K 6301. The results are shown in Table 2.

On the other hand, as comparative examples, the case of age resister alone, the case of polyethylene glycol alone and the case where the molecular weight of polyethylene glycol is less than 100 or more than 5,000 are also shown. It is apparent from Table 2 that the rubbery polymer compositions of this invention are remarkably improved in heat-aging-resistance as compared with the comparative examples.

Comparing Example 1 with Example 13, it can be seen that the use of a combination of the age-resister co-agent (I) and the age-resister co-agent (II) is more effective than the use of the age resister co-agent (I) alone.

Comparing Example 1 with Examples 14 to 17, it can be seen that the age resister linked to the rubbery polymer is more effective than the mere blend of the age resister with the rubbery polymer when the vulcanizate is contacted with an organic solvent at elevated temperature for a long period of time.

What is claimed is:

1. A heat-aging-resistant diene rubbery polymer composition, comprising;
a rubbery polymer having an age resister incorporated therein, prepared by copolymerizing or homopolymerizing at least one monomer selected from the group consisting of butadiene, isoprene and chloroprene optionally in the presence of at least one rubber comonomer and in the presence of N-(4-anilinophenyl)-acrylamide or N-(4-anilinophenyl)-methacrylamide monomer which confers age resisting characteristics to said rubbery polymer and having admixed therewith from 0.01–10 parts by weight of a polyalkylene glycol having an average molecular weight of 100–5,000 per 100 parts by weight of said rubbery polymer.

2. A heat-aging-resistant rubbery polymer composition according to claim 1, wherein said rubbery polymer is a polymer of a diene type monomer.

3. A heat-aging-resistant rubbery polymer composition according to claim 2, wherein said polymer of a diene type monomer is at least one polymer selected from the group consisting of butadiene-acrylonitrile copolymer, butadiene-styrene copolymer, isoprene-acrylonitrile copolymer, isoprene-butadieneacrylontrile copolymer, polybutadiene, polychloroprene and polyisoprene.

4. The heat-aging-resistant rubbery polymer composition according to claim 1, wherein said age resister is present in said polymer in a proportion of 0.01–10 parts by weight per 100 parts by weight of rubbery polymer.

5. A heat-aging resistant rubbery polymer composition according to claim 4, wherein said proportion of age resister is 0.1–5 parts by weight.

6. A heat-aging-resistant rubbery polymer composition according to claim 1, 2, 3, 4 or 5, wherein said polyalkylene ether glycol is selected from the group consisting of polyethylene glycol, polypropylene glycol, polytetramethylene glycol and polyepichlorohydrin glycol.

7. A heat-aging-resistant rubbery polymer composition according to claim 1, which further comprises an age-resister co-agent of the formula:

$$RO-\underset{\underset{O}{\|}}{C}-CH_2CH_2-S-CH_2CH_2-\underset{\underset{O}{\|}}{C}-OR$$

wherein R is an alkyl group having 10 to 20 carbon atoms.

8. A heat-aging-resistant rubbery polymer composition according to claim 7, wherein the amount of said co-agent present in said rubber polymer composition is 0.1 to 10 parts by weight per 100 parts by weight of the rubber polymer.

9. A heat-aging-resistant rubbery polymer composition according to claim 7, wherein the amount of said co-agent present in said polymer composition is 0.1 to 5 parts by weight per 100 parts by weight of the rubber polymer.

10. A heat-aging-resistant rubbery polymer composition according to claim 7, 8 or 9, wherein said co-agent has the formula:

$$C_{12}H_{25}O-\underset{\underset{O}{\|}}{C}-CH_2CH_2-S-CH_2CH_2-\underset{\underset{O}{\|}}{C}-OC_{12}H_{25}$$

$$C_{18}H_{37}O-\underset{\underset{O}{\|}}{C}-CH_2CH_2-\text{ or }-S-CH_2CH_2-\underset{\underset{O}{\|}}{C}-OC_{18}H_{37}.$$

11. A method of improving the heat-aging-resisting properties of a rubbery polymer composition, comprising:

homopolymerizing or copolymerizing at least one monomer selected from the group consisting of butadiene, isoprene and chloroprene optionally in the presence of at least one rubber comonomer and in the presence of N-(4-anilinophenyl)-acrylamide or N-(4-anilinophenyl)-methacrylamide monomer which confers age resisting characteristics to said rubbery polymer; and admixing the copolymer obtained with from 0.01–10 parts by weight of a polyalkylene glycol having an average molecular weight of 100–5,000 per 100 parts by weight of said rubbery polymer.

* * * * *